US008151365B2

(12) United States Patent
Chen et al.

(10) Patent No.: US 8,151,365 B2
(45) Date of Patent: Apr. 3, 2012

(54) FILTERING ACCESS TO DATA OBJECTS (75) Inventors: Jianyu Chen, San Jose, CA (US); Jan Gronski, Palo Alto, CA (US); Jian Yang, Shanghai (CN); Xiaoqing Lu, Shanghai (CN); Yang Song, Shanghai (CN)

(73) Assignee: Cisco Technologies, Inc., San Jose, CA (US)

( * ) Notice: Subject to any disclaimer, the term of this patent is extended or adjusted under 35 U.S.C. 154(b) by 890 days.

(21) Appl. No.: 11/638,765

(22) Filed: Dec. 13, 2006

(65) Prior Publication Data
US 2008/0120415 A1 May 22, 2008

(30) Foreign Application Priority Data
Nov. 16, 2006 (CN) .......................... 2006 1 0138200

(51) Int. Cl.
*G06F 7/04* (2006.01)
*G06F 9/44* (2006.01)
(52) U.S. Cl. ............................. 726/30; 717/110; 726/4
(58) Field of Classification Search ............... 726/30, 726/4; 717/110
See application file for complete search history.

(56) References Cited

U.S. PATENT DOCUMENTS

| 5,933,641 | A | 8/1999 | Ma |
| 5,937,192 | A | 8/1999 | Martin |
| 6,110,228 | A | 8/2000 | Albright et al. |
| 6,256,776 | B1 | 7/2001 | Melanson |
| 7,076,534 | B1 * | 7/2006 | Cleron et al. .................. 709/219 |
| 2002/0104071 | A1 * | 8/2002 | Charisius et al. .............. 717/109 |
| 2002/0108101 | A1 * | 8/2002 | Charisius et al. .............. 717/105 |
| 2005/0028137 | A1 * | 2/2005 | Evans et al. .................... 717/110 |
| 2005/0044531 | A1 * | 2/2005 | Chawla et al. ................. 717/122 |
| 2005/0097197 | A1 | 5/2005 | Vincent |
| 2005/0177812 | A1 * | 8/2005 | Andrew et al. ................ 717/100 |

(Continued)

FOREIGN PATENT DOCUMENTS
CN     1553361 A1    12/2004

OTHER PUBLICATIONS

Luo Shengqi, et al; "Network File Download and Upload Managing System and Method"; Translation of cited portions of CN1553361 (p. 3, line 22; p. 5, line 14; Figs. 1-4).

*Primary Examiner* — Techane Gergiso
(74) *Attorney, Agent, or Firm* — FIsh & Richardson P.C.

(57) ABSTRACT

In one embodiment, a code server and edit server are provided. The code server stores the source code. Users do not access the code server directly. Rather, an edit server is used where users can log in to the edit server and send requests to edit portions of the source code. The edit server then sends requests to the code server for requested portions of the source code. Different users may have different access-rights to portions of the code. When the request is received from the edit server, if the code server determines the user requesting the portion of the source code does not have access rights to it, then the code server does not allow the portion of code to be accessed. However, if the user does have access rights, then the portion of the source code is retrieved and sent to the edit server. The user can then edit the source code on the edit server.

15 Claims, 4 Drawing Sheets

U.S. PATENT DOCUMENTS

| | | | |
|---|---|---|---|
| 2005/0193369 A1* | 9/2005 | Brumme et al. | 717/106 |
| 2005/0229154 A1* | 10/2005 | Hiew et al. | 717/110 |
| 2006/0047780 A1* | 3/2006 | Patnude | 709/219 |
| 2006/0053410 A1* | 3/2006 | Charisius et al. | 717/109 |
| 2006/0200799 A1* | 9/2006 | Wills et al. | 717/109 |
| 2006/0218523 A1* | 9/2006 | Tatsumi et al. | 717/106 |
| 2006/0277231 A1* | 12/2006 | Kral et al. | 708/102 |
| 2007/0055964 A1* | 3/2007 | Mirkazemi et al. | 717/140 |
| 2007/0079384 A1* | 4/2007 | Grinstein | 726/27 |
| 2007/0162568 A1* | 7/2007 | Gupta et al. | 709/219 |

* cited by examiner

FILTERING ACCESS TO DATA OBJECTS

CROSS REFERENCES TO RELATED APPLICATIONS

Pursuant to Article 4 of the Paris Convention, this application claims priority to Chinese Patent Application No. 200610138200.9 entitled "Filtering Access to Data Objects" filed on Nov. 16, 2006, which is incorporated by reference in its entirety for all purposes.

TECHNICAL FIELD

Embodiments of the present invention generally relate to software development and more specifically to filtering access to portions of source code being developed.

BACKGROUND

In a software development cycle, source code is typically developed by many different teams. The different teams may be responsible for different portions of the source code. As software programs become more complicated, the source code generated becomes very complex and large.

The source code may be built during the development process. This may convert source code files into executable code. The build may occur periodically, such as daily, or at any other time. The build typically compiles and links various files that are interdependent in the source code. To compile and link the files together, the source code is typically stored on the same server. The editing and compilation is also performed on the same server so the files can be built together. Thus, users who are editing the source code have visibility to all of the source code at once. This may allow access to portions of source code to different teams that may not be developing those portions. This may not be desirable when intellectual property is being protected. For example, an organization may not want some teams to be able to view other portions of the source code.

DESCRIPTION OF EXAMPLE EMBODIMENTS

Overview

In one embodiment, a code server and edit server are provided. The code server stores the source code. Users do not access the code server directly. Rather, an edit server is used where users can log in to the edit server and send requests to edit portions of the source code. The edit server then sends requests to the code server for requested portions of the source code.

Different users may have different access rights to portions of the code. For example, a first user may be able to access a first portion of the code and a second user may be able to access a second portion of the code but not vice versa. When the request is received from the edit server, if the code server determines the user requesting the portion of the source code does not have access rights to it, then the code server does not allow the portion of code to be accessed. However, if the user does have access rights, then the portion of the source code is retrieved and sent to the edit server. The user can then edit the source code on the edit server.

When the user is finished editing the source code, the edit server sends the edited source code back to the code server. The code server then stores the portion of the source code back into the source code. The above process is performed such that the source code can still be built/compiled. Even though portions are sent to the edit server for editing, the source code directory is maintained. The edited source code is then stored back in the directory such that the source code can be built with the edited code.

Example Embodiments

Figure 1:
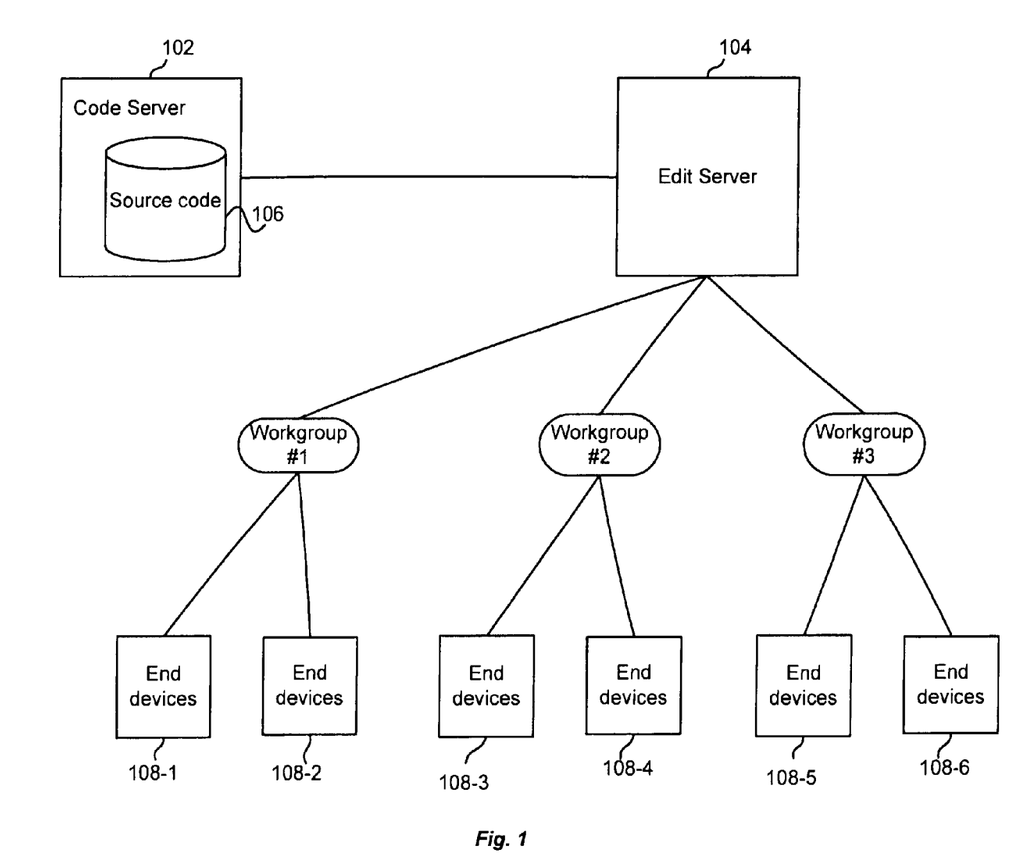
FIG. 1 depicts an example system for managing source code.

FIG. 1 depicts an example system 100 for managing source code. As shown, a code server 102, an edit server 104, storage 106, and user devices 108 are provided.

Code server 102 may be any computing device. For example, code server 102 may be a server. In other particular embodiments, code server 102 may include a storage system, mainframe, or any other computing device.

Code server 102 includes source code. In one embodiment, source code may be stored in a directory or file system in storage 106. The source code may be any software code. For example, the source code may include code that needs to be built. For example, building the source code involves compiling and linking files in the source code into an executable form. A person skilled in the art will appreciate various method of building source code and different forms of source code.

Edit server 104 may be any computing device, such as a server. Further, in other embodiments, edit server 104 may be a mainframe, workstation, personal computer, or any other computing device.

Edit server 104 and code server 102 may be separate devices. In this case, a user needs to use edit server 104 to interact with code server 102. However, it will be understood that edit server 104 and code server 102 may be part of the same device, but are partitioned such that a user cannot directly access code server 102.

User devices 108 are devices that a user uses to access edit server 104. In one embodiment, user devices 108 include personal computers, laptop computers, workstations, etc.

User devices 108 may be associated with various users where users may be separated into workgroups. Workgroups may be a group of users that have the same access rights or permissions. For example, a certain group may have first access rights and a second group may have second access rights. These access rights may allow access to different portions of the source code.

Although workgroups are described for groups of users, it will be understood that different users in workgroups may have different rights. For example, rights for all users may be individually tailored. Or, the process may be simplified by subdividing users into various workgroups.

Embodiments of the present invention restrict access to source code. Also, users do not access the source code directly from code server 102. Rather, the requests are sent to edit server 104. Edit server 104 then sends the requests to code server 102, which then can determine the access rights for the user. If the user is allowed to access the portion of code requested, the code is retrieved and sent to edit server 104. The user can then edit the portion of the source code using edit server 104.

When the user is finished editing the source code, edit server 104 may send the edited source code back to code server 102, which can then restore the edited portion of the source code in the source code.

Figure 2:
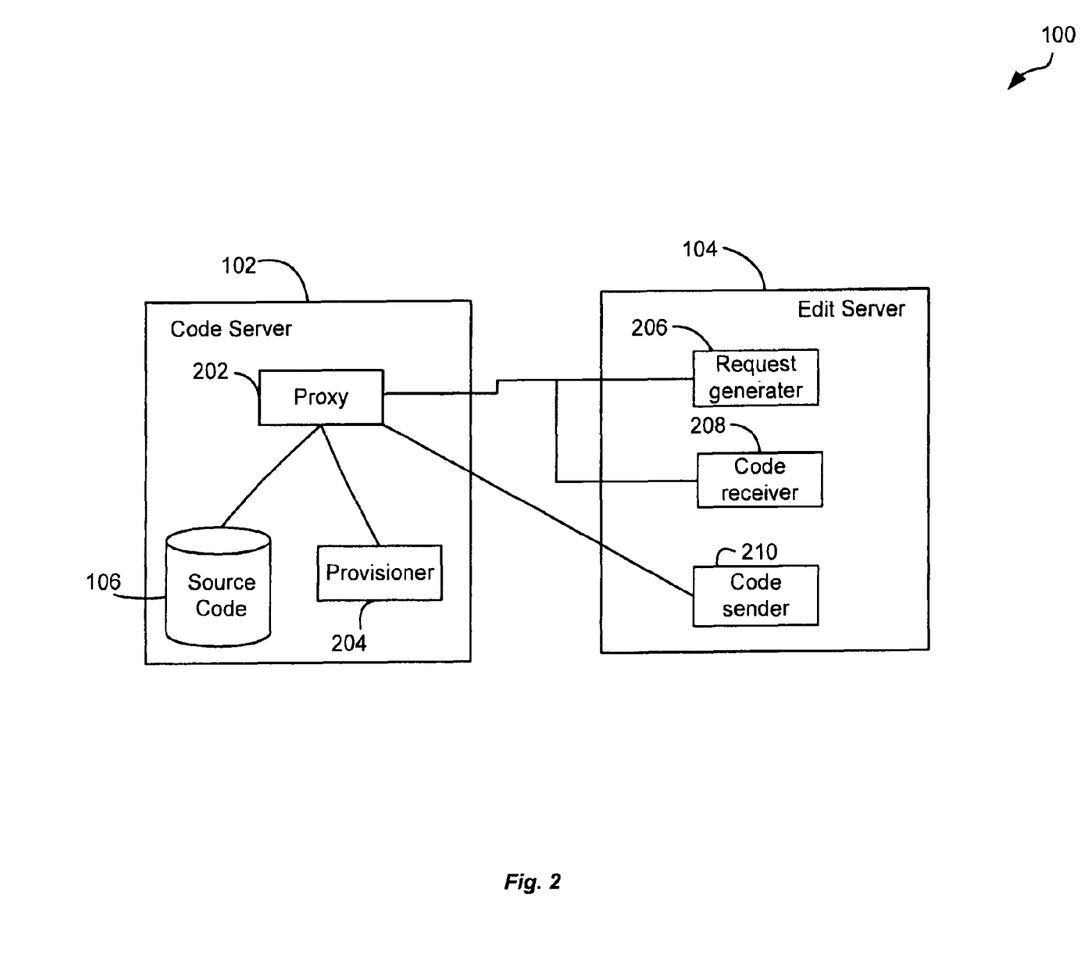
FIG. 2 depicts a more detailed example of the system depicted in FIG. 1.

FIG. 2 depicts a more detailed example of system. As shown, code server 102 includes a proxy 202, a provisioner 204, and storage 106. Edit server 104 includes a request generator 206, a code receiver 208, and a code sender 210.

Request generator 206 receives requests from users. For example, a user may use a user device 108 to send a request for a portion of the source code. In one embodiment, a user may browse the directory of the source code using edit server 104. For example, the directory of the source code stored on code server 102 may be duplicated on edit server 104. When a portion of the source code, such as a file, is desired by the user, the user can browse for that file and then send a request to request generator 206. Request generator 206 then generates a request for the portion of code for coder server 102. The request may identify a portion of code, e.g. file (or files), and also include information about the user who is requesting the source code.

The information about the user may include a user identifier, the workgroup the user is associated with, the product the user is working on, the project the user is working on, etc. The information is used to determine what portions of the source code stored on code server 102 the user is authorized to access.

The request may also be secured using any security protocol. For example, secure shell (ssh) may be used to send the request from request generator 206 to proxy 202. Additionally, other methods of securing the request, such as using certificates, passwords, etc. may be used.

Proxy 202 receives the request and then authenticates the request. The authentication may include device authentication and user authentication. For example, proxy 202 may authenticate a key that has been used to encrypt the request. The authentication may be to make sure that the request was sent by an authorized device that can request portions of the source code. User authentication may be authenticated through log-in name and password, public key, private key, certificates.

Provisioner 204 is provisioned through an administrator and is used to determine the authorizations for the user. Provisioner 204, after authentication, may use the authenticated info (such as user name) to determine the access rights. For example, an access filter may be provisioned for each user or workgroup. Different workgroups may be given different authorizations, which allow access to different sections of the source code. Also, proxy 202 may detect if the user is listed in an authorized user list for the product included in the request, determine if the request is within the project scope, etc.

Provisioner 204 determines the access filter for the user and applies it to the request. If the requested portion of code is found in the access filter as being a portion of code that the user can access, then the request is approved. If the access filter shows the user is not authorized to access the portion of code requested, then provisioner 204 may deny the request. In the case of denying the request, proxy 202 sends a message back to request generator 206 indicating the request is denied. The user may then be sent a message that the user's request is denied.

If the user is authorized to access the portion of the source code, proxy 202 then retrieves the portion of the source code from storage 106. An encrypted session with edit server 104 is then established. In the encrypted session, proxy 202 transfers the portion of source code to code receiver 208. For example, any number of source code files may be transferred in the encrypted session.

After the transfer, the user can view, modify, and edit the source code files from edit server 104. For example, the files may be accessed from edit server 104. In one embodiment, device 108 uses a virtual terminal (such as VNC) to view/edit the source code directly on device 104. In another embodiment, a user may use user device 108-1 to download the portion of source code. The user may then edit, view, and modify the source code on user device 108-1. Edit server 104 thus allows editing of the source code either while it is stored on it or by allowing download of the source code. Code server 102 does not allow editing of the source code and may only send it to code server 102 such that code server 102 can allow the editing.

When the user is finished working on the portion of source code, code sender 210 may establish another encrypted session with code server 102. In this session, code sender 210 sends the edited source code back to proxy 202.

For example, the modified source code files are transferred from edit server 104 to code server 102. Proxy 202 then stores the edited portion of source code back into the source code stored in storage 106. For example, the edited files may replace the same files found in the source code.

Accordingly, separation of editing and storing of source code is provided. The source code is stored on a first device and the editing is allowed on a second device. Editing is not allowed on the first device. This ensures that portions of source code can be partitioned and access can be restricted to certain portions. Intellectual property (IP) is thus protected by the separation and restriction of access.

Source code, unlike text documents, is not the final form of a final product. In order for source code to be "useful", a build process needs to be applied to the source code, which transforms the source code into machine language, later to be executed on another device. For example, this transformation from source code to machine language is called a "compile process or a build" process. This process may require all or partial source code from the project code base. For example, the build may require .h header files. The built binaries can be transferred from code server 102 to edit server 104 for debugging, packaging, etc. The source code in storage 106 may be built at any time. Even if a portion of the source code has been checked out, the original source code (i.e., the portion that is not being edited) can be built. However, once the edited portion of source code is stored in storage 106, a command to build the source code may be sent. In one embodiment, a request may be sent remotely from edit server 104 to code server 102.

In a build, various files in the source code may be interdependent and in order to build the file, the other interdependent files need to be accessed. However, certain users may not have access to the dependent files. Accordingly, conventionally, a user would have had to access all of those files. However, in this case, particular embodiments allow a user to access a file but since all the files are stored on code server 102, the file may be built where other files that are not accessible to the user may also be used in the build.

The build may proceed but the user may not edit the interdependent files. This preserves protection of IP information but also allows a build to be performed.

Figure 3:
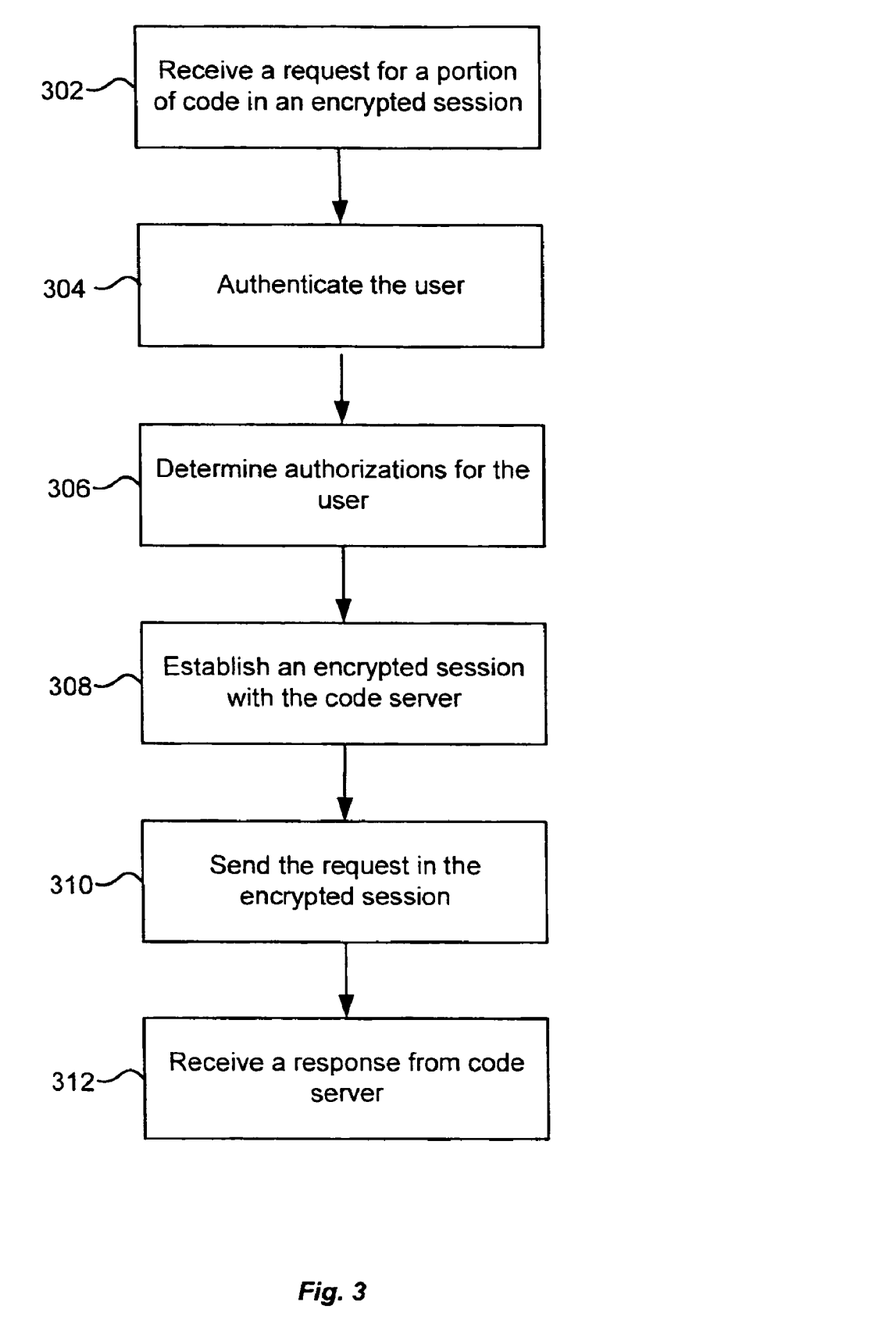
FIG. 3 depicts an example of a method for controlling access to source code.

FIG. 3 depicts an example of a method for controlling access to source code. In step 302, edit server 104 receives a request for a portion of source code. The request may be received from a user.

In step 304, edit server 104 determines information for the user. For example, the information may be the user identity, a workgroup the user is associated with, etc.

In step 306, edit server 104 generates a request for the portion of source code.

In step 308, edit server 104 establishes an encrypted session with code server 102. The encrypted session may be established using any encryption methods.

In step 310, edit server 104 sends the request in the encrypted session.

In step 312, edit server 104 receives a response from code server 102. The response may be a denial of the request if the user is not authorized to access the portion of source code. Also, the response may be the portion of the source code that was requested by the user if the user is authorized to access that portion of source code.

Figure 4:
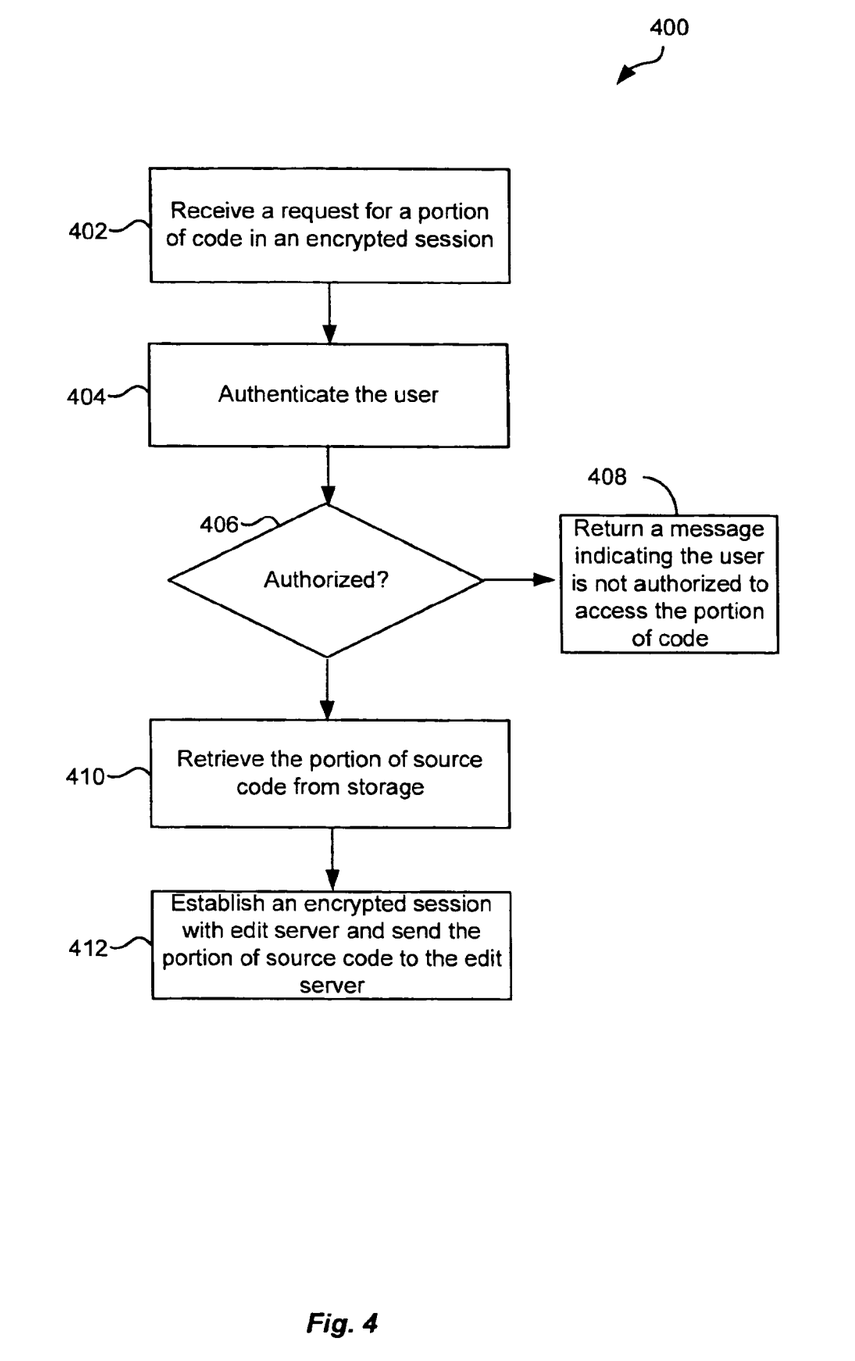
FIG. 4 depicts an example method for determining if a user is authorized to access a portion of source code from a code server.

FIG. 4 depicts an example method for determining if a user is authorized to access a portion of source code from code server 102. In step 402, code server 102 receives a request for a portion of code in an encrypted session. The request includes information about the user who submitted the request.

In step 404, code server 102 authenticates the user. In this case, code server 102 determines if the request is valid.

In step 406, code server 102 determines authorizations for the user. For example, for a workgroup that the user is in, different portions of code may be accessible to that workgroup. Code server 102 determines if the portion of code requested is part of the source code that the user is authorized to access. This is done based on filters or any other methods.

If the user is not authorized, code server 102 returns a message indicating the user is not authorized to access the portion of code.

If the user is authorized, in step 410, the portion of source code is retrieved from storage 106.

In step 412, an encrypted session with edit server 104 is established and the portion of source code is sent to edit server 104.

Particular embodiments partition the source code such that different portions of the source code may be accessed from code server 102. The code can then be viewed, modified, and edited on edit server 104. Thus, users cannot access code server 102 directly. This allows the control of the source code on code server 102 but also allows users to modify portions of the source code they are allowed to access. Also, the underlying operating system is not changed such that a build can be performed on the source code stored on code server 102.

Although the invention has been described with respect to specific embodiments thereof, these embodiments are merely illustrative, and not restrictive of the invention. For example, the code and edit servers are virtual servers. They need not be bounded by hardware. For example, edit and code servers can run on the same physical server via a virtualization program. (vmware for example). Also code servers can be one or multiple servers that are logically joined as to give the user an appearance of one server.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method comprising:
   receiving, at a first device which does not allow editing, a request for a portion of source code stored on the first device from a second device, wherein the second device facilitates a user to submit the request to the first device, the first device comprising:
   a first attribute that the portion of the source code is not editable on the first device, and
   a second attribute related to a permission for a user to have access to the portion of source code on the first device;
   determining if the user associated with the received request has permission to access the portion of the source code from the first device;
   upon determining that the user has the permission to access the source code, sending a request to receive the portion of the source code from the first device;
   authenticating the request from the second device;
   receiving the portion of the source code from the first device;
   sending the portion of the source code from the first device to the second device, wherein the second device comprises an attribute that permits the portion of the source code to be edited on the second device;
   receiving, at the first device, an edited version of the portion of the source code from the second device;
   storing the edited version of the portion of the source code in the first device; and
   compiling, on the first device, the source code and the edited version of the portion of the source code.

2. The method of claim 1, wherein determining if the user associated with the request has permission to access the portion of the source code comprises:
   determining user information associated with the user; and
   using the user information to determine if the user is authorized to access the portion of the source code.

3. The method of claim 1, wherein the source code is built on the first device but not edited on the first device, and the second device comprises an editor that allows editing of the portion of the source code.

4. A method comprising:
   receiving, at a first device, a user request for a portion of source code stored on a second device which does not allow editing;
   establishing an encrypted session with the second device;
   sending the code request in the encrypted session;
   generating a code request for the portion of source code stored on the second device;
   receiving the portion of the source code from the second device if the second determines a user associated with the user request is authorized to access the portion of the source code;
   allowing editing of the portion of the source code through the first device, wherein the source code is not editable on the second device;
   sending the edited portion of the source code to the second device after editing; and
   building the portion of source code, wherein a second portion of source code that the user is not authorized to access is used in the build.

5. The method of claim 4, further comprising determining user information associated with the user to include in code request for determining if the user is authorized to access the portion of the source code.

6. The method of claim 5, wherein the user information comprises a workgroup associated with the user, wherein the workgroup is associated with portions of the source code that are accessible to users in the workgroup.

7. The method of claim 4, wherein the source code is built on the second device but not edited, and first device allows editing of the portion of the source code.

8. An apparatus comprising:
one or more electronic processors; and
logic encoded in one or more tangible media for execution by the one or more processors configured to:
receive, at a first device which does not allow editing, a request for a portion of source code stored on the first device from a second device, wherein a user submits the request through the second device;
authenticate the request from the second device;
determine if a user associated with the request is authorized to access the portion of the source code from the first device;
retrieve the portion of the source code;
send the portion of the source code to the second device, wherein second device allows editing of the portion of the source code, wherein the portion of the source code is not editable on the first device;
receive, at the first device, an edited portion of the source code from the second device;
store the edited portion of the source code in the source code; and
build the portion of source code, wherein a second portion of source code that the user is not authorized to access is used in the build.

9. The apparatus of claim 8, wherein the logic, when executed, is further operable to:
determine user information associated with the user; and
use the information to determine if the user is authorized to access the portion of the source code.

10. The apparatus of claim 8, wherein the source code is built on the first device but not edited, and the second device allows editing of the portion of the source code.

11. An apparatus comprising:
one or more electronic processors; and
logic encoded in one or more tangible media for execution by the one or more processors configured to:
receive, at a first device, a user request for a portion of source code stored on a second device which does not allow editing;
establish an encrypted session with the second device;
send the code request in the encrypted session;
generate a code request for the portion of source code stored on the second device;
receive the portion of the source code from the second device if the second determines a user associated with the user request is authorized to access the portion of the source code;
allow editing of the portion of the source code through the first device, wherein the source code is not editable on the second device;
send the edited portion of the source code to the second device after editing; and
build the portion of source code, wherein a second portion of source code that the user is not authorized to access is used in the build.

12. The apparatus of claim 11, wherein the logic, when executed, is further operable to determine user information associated with the user to include in code request for determining if the user is authorized to access the portion of the source code.

13. The apparatus of claim 12, wherein the user information comprises a workgroup associated with the user, wherein the workgroup is associated with portions of the source code that are accessible to users in the workgroup.

14. The apparatus of claim 11, wherein the source code is built on the second device but not edited, and the first device allows editing of the portion of the source code.

15. A non-transitory computer readable medium being configured to store instructions on a storage unit for a distributed computing system having a first device and a second device, the instructions, when executed, are configured to at least cause the first device to perform operations comprising:
receiving, at a first device which does not allow editing, a request for a portion of source code stored on the first device from a second device, wherein the second device facilitates a user to submit the request to the first device, the first device comprising:
a first attribute that the portion of the source code is not editable on the first device, and
a second attribute related to a permission for a user to have access to the portion of source code on the first device;
determining if the user associated with the received request has permission to access the portion of the source code from the first device;
authenticating the request from the second device;
upon determining that the user has the permission to access the source code, sending a request to receive the portion of the source code from the first device; receiving the portion of the source code from the first device; sending the portion of the source code from the first device to the second device, wherein the second device comprises an attribute that permits the portion of the source code to be edited on the second device;
receiving, at the first device, an edited version of the portion of the source code from the second device;
storing the edited version of the portion of the source code in the first device; and
compiling, on the first device, the source code and the edited version of the portion of the source code.

* * * * *